United States Patent
Nishimoto et al.

(10) Patent No.: US 10,031,358 B2
(45) Date of Patent: Jul. 24, 2018

(54) DISPLAY DEVICE

(71) Applicant: Japan Display Inc., Tokyo (JP)

(72) Inventors: Takuya Nishimoto, Tokyo (JP); Yuichi Tsubaki, Tokyo (JP)

(73) Assignee: Japan Display Inc., Tokyo (JP)

( * ) Notice: Subject to any disclaimer, the term of this patent is extended or adjusted under 35 U.S.C. 154(b) by 42 days.

(21) Appl. No.: 15/057,606

(22) Filed: Mar. 1, 2016

(65) Prior Publication Data

US 2016/0259203 A1    Sep. 8, 2016

(30) Foreign Application Priority Data

Mar. 4, 2015 (JP) .................................. 2015-042761

(51) Int. Cl.
    *G09F 13/04* (2006.01)
    *G02F 1/1333* (2006.01)

(52) U.S. Cl.
    CPC .. *G02F 1/133308* (2013.01); *G02F 1/133305* (2013.01); *G02F 2001/13332* (2013.01); *G02F 2001/133314* (2013.01); *G02F 2001/133317* (2013.01); *G02F 2001/133331* (2013.01)

(58) Field of Classification Search
    CPC ......... G02F 1/133308; G02F 1/133305; G02F 2001/13332; G02F 2001/133314; G02F 2001/133317; G02F 2001/133331; G02F 1/1333; G09F 9/00
    See application file for complete search history.

(56) References Cited

U.S. PATENT DOCUMENTS

| 2009/0091681 | A1  | 4/2009  | Nishizawa et al. |
| 2012/0086872 | A1* | 4/2012  | Yokota ............... G02F 1/133608 362/362 |
| 2014/0146442 | A1* | 5/2014  | Kuo ....................... G02F 1/1333 361/679.01 |
| 2015/0192824 | A1* | 7/2015  | Hirota .................. G02B 6/0088 349/58 |
| 2015/0212549 | A1* | 7/2015  | Shin ................... G02F 1/133308 361/679.26 |
| 2015/0346538 | A1* | 12/2015 | Hsiao ................ G02F 1/133308 349/58 |
| 2016/0187709 | A1* | 6/2016  | Lee ................... G02F 1/133308 349/58 |

FOREIGN PATENT DOCUMENTS

JP    2009-086560    4/2009

* cited by examiner

*Primary Examiner* — Y M. Lee
(74) *Attorney, Agent, or Firm* — K&L Gates LLP

(57) ABSTRACT

According to an aspect, a display device includes: a covering member having a curved surface part; a display panel bonded to the curved surface part while being curved along the curved surface part; a front frame bonded to the curved surface part while surrounding the entire outer circumference of the display panel; a backlight that is fitted into the front frame, arranged to be opposed to the display panel, and has a gap between the backlight and part of an inner wall surface of the front frame; and a flexible printed circuit board, a first end of the flexible printed circuit board being electrically coupled to the display panel, and a second end of the flexible printed circuit board passing through the gap to be drawn to the outside of a space surrounded by the front frame.

7 Claims, 3 Drawing Sheets

DISPLAY DEVICE

CROSS-REFERENCE TO RELATED APPLICATIONS

This application claims priority from Japanese Application No. 2015-042761, filed on Mar. 4, 2015, the contents of which are incorporated by reference herein in its entirety.

BACKGROUND

Technical Field

The present disclosure relates to a display device.

Description of the Related Art

Display devices including a curved display panel have been known (for example, Japanese Patent Application Laid-open Publication No. 2009-86560). This type of display device is called a curved display. The display panel is made using a thin film substrate. The display panel is bonded to a curved covering member for protecting a display surface. Display on a curved surface is implemented by the display panel bonded to the curved covering member.

The display panel is fixed to a backlight while being bonded to the covering member. The backlight is bonded to the covering member at a position surrounding the display panel. A bonding layer has an opening through which a flexible printed circuit board (hereinafter, abbreviated as "FPC" in some cases) is drawn to the outside. However, when the opening is provided to the bonding layer, a foreign substance may enter from the outside through the opening, or light of the backlight may leak to the outside. If any defect is detected, the display device is subjected to disassembling work (rework processing). When the covering member is firmly bonded to the backlight, the disassembling work is difficult to perform.

SUMMARY

According to an aspect, a display device includes: a covering member having a curved surface part; a display panel bonded to the curved surface part while being curved along the curved surface part; a front frame bonded to the curved surface part while surrounding the entire outer circumference of the display panel; a backlight that is fitted into the front frame, arranged to be opposed to the display panel, and has a gap between the backlight and part of an inner wall surface of the front frame; and a flexible printed circuit board, a first end of the flexible printed circuit board being electrically coupled to the display panel, and a second end of the flexible printed circuit board passing through the gap to be drawn to the outside of a space surrounded by the front frame.

DETAILED DESCRIPTION

Figure 1:
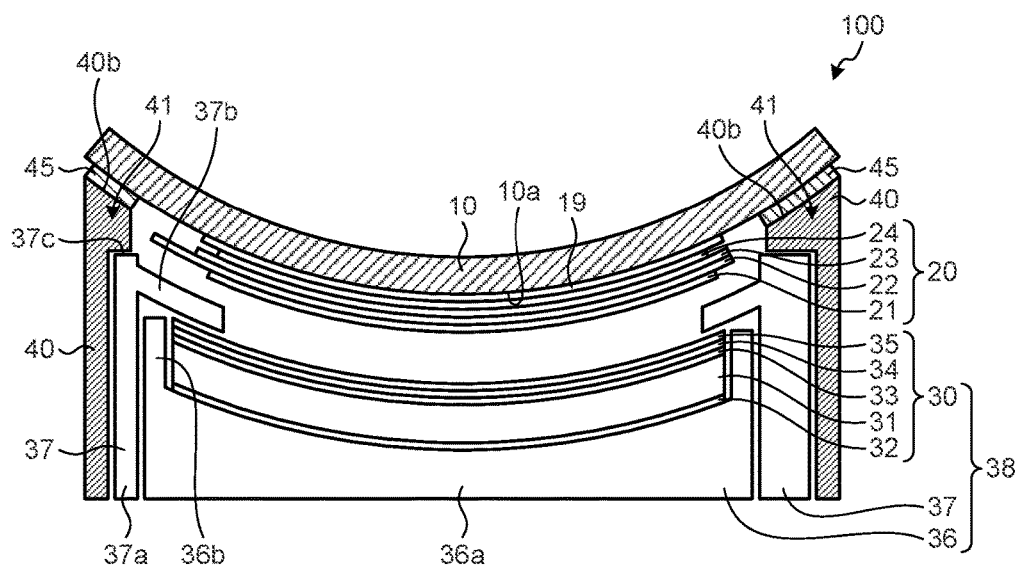
FIG. 1 is a cross-sectional view of a display device according to an embodiment of the present invention.

The following describes a preferred embodiment in detail with reference to the drawings. The present invention is not limited to the embodiment described below. Components described below include a component that is easily conceivable by those skilled in the art and substantially the same component. The components described below can be appropriately combined. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

Figure 2:
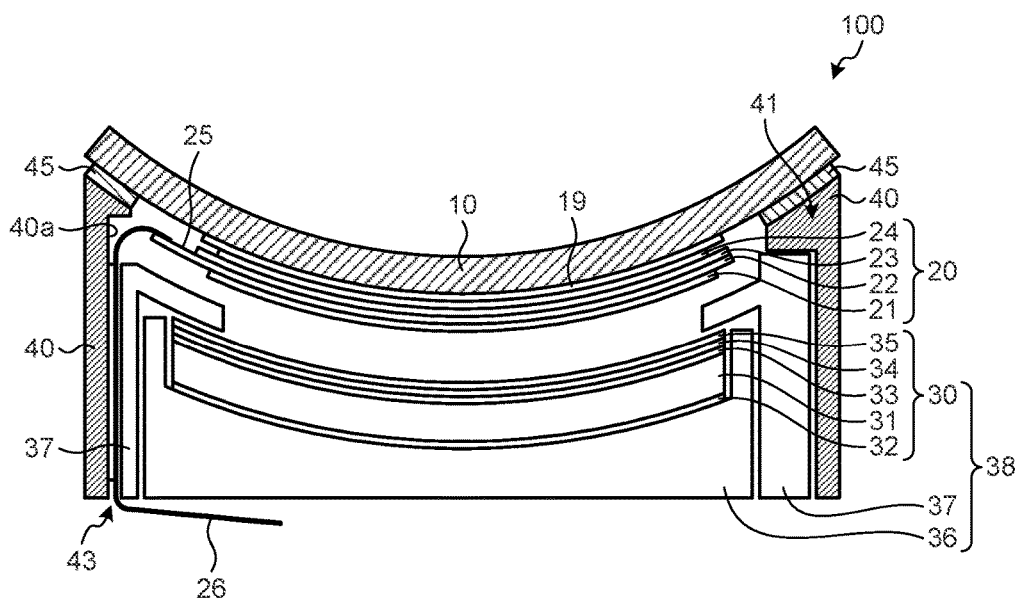
FIG. 2 is a cross-sectional view of the display device according to the embodiment.
Figure 3:
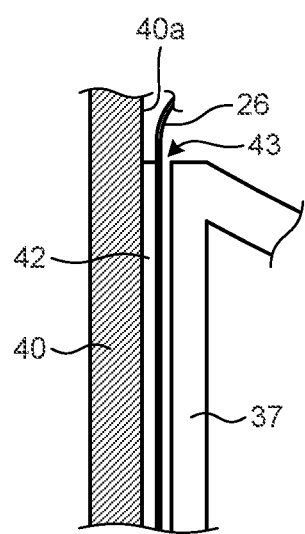
FIG. 3 is an enlarged view of a gap between a backlight and a front frame.

FIGS. 1 and 2 are cross-sectional views of a display device 100 according to an embodiment of the present invention. FIG. 1 is a cross-sectional view of a portion of the display device 100 to which a flexible printed circuit board (FPC) 26 is not provided. FIG. 2 is a cross-sectional view of a portion of the display device 100 to which the FPC 26 is provided. FIG. 3 is an enlarged view of a gap between a backlight 38 and a front frame 40 in the display device 100.

As illustrated in FIGS. 1 and 2, the display device 100 includes a covering member 10, a display panel 20, the FPC 26, the backlight 38, and the front frame 40.

The display panel 20 includes a first polarizing plate 21, a first substrate 22, a second substrate 23, and a second polarizing plate 24. The second substrate 23 is arranged to be opposed to the first substrate 22. A liquid crystal layer (not illustrated) is arranged between the first substrate 22 and the second substrate 23. The first polarizing plate 21 is arranged on a surface of the first substrate 22 opposite to the second substrate 23. The second polarizing plate 24 is arranged on a surface of the second substrate 23 opposite to the first substrate 22. The first substrate 22 has a projecting part 25 that projects outward from the second substrate 23. A terminal part (not illustrated) is provided to the projecting part 25, and the FPC 26 is electrically coupled to the terminal part.

The backlight 38 includes a light guide body 30, a first frame 36, and a second frame 37.

The light guide body 30 includes a light guide plate 31, a reflective sheet 32, a first optical sheet 33, a second optical sheet 34, and a third optical sheet 35. A light source (not illustrated) such as a cold cathode fluorescent lamp (CCFL) or a light emitting diode (LED) is arranged on a side surface of the light guide plate 31. The light guide plate 31 propagates incident light from the side surface throughout the light guide plate to be emitted from an upper surface of the light guide plate 31. The reflective sheet 32 is arranged on a lower surface of the light guide plate 31. On the upper surface of the light guide plate 31, the first optical sheet 33, the second optical sheet 34, and the third optical sheet 35 are arranged in this order from the light guide plate 31 side. The first optical sheet 33, the second optical sheet 34, and the third optical sheet 35 control directivity of the light emitted from the upper surface of the light guide plate 31 toward the display panel 20.

The first frame 36 includes a bottom plate part 36a supporting a lower surface of the light guide body 30 and a first frame body 36b surrounding a side of the light guide body 30. The light guide body 30 is accommodated in a space surrounded by the bottom plate part 36a and the first frame body 36b. The second frame 37 includes a second frame body 37a surrounding a side of the first frame body 36b and an edge cover 37b that covers an edge of the upper surface of the light guide body 30. The first frame 36 is fitted into the second frame 37 along an inner wall surface of the second frame body 37a. The first frame 36 and the second frame 37 are fixed to each other with a screw (not illustrated).

The center part of the light guide body 30 is exposed from the edge cover 37b. The display panel 20 is irradiated with the light emitted from the center part of the light guide body 30. The display panel 20 modulates the light emitted from the light guide body 30 to form an image.

The covering member 10 is bonded to a display surface of the display panel 20 (a surface opposite to the backlight 38 side) via a bonding layer 19. The covering member 10 is, for example, a transparent substrate that can transmit visible light such as a glass substrate or a plastic substrate. The covering member 10 transmits the light modulated by the display panel 20. The covering member 10 includes a curved surface part 10a. The display panel 20 is bonded to the curved surface part 10a while being curved along the curved surface part 10a. The covering member 10 protects the display surface of the display panel 20 and keeps the curved shape of the display panel 20.

Members constituting the display panel 20 are thinned to easily follow the curved shape of the curved surface part 10a. For example, each of the first substrate 22 and the second substrate 23 is a glass substrate having a thickness from 50 μm to 200 μm.

The front frame 40 having a cylindrical shape is bonded to an edge of the covering member 10 via a bonding layer 45. The front frame 40 is bonded to the curved surface part 10a while surrounding the entire outer circumference of the display panel 20. An upper end surface 40b of the front frame 40 bonded to the curved surface part 10a has a curved shape corresponding to the curved shape of the curved surface part 10a. The bonding layer 45 is formed in a closed ring shape, and there is no gap between the upper end surface 40b and the curved surface part 10a.

The backlight 38 is fitted into the front frame 40 and arranged to be opposed to the display panel 20. The front frame 40 includes a claw part 41 for positioning the backlight 38 at a position separated from the display panel 20. The position of the backlight 38 is fixed due to an upper end surface 37c of the second frame 37 being caught by the claw part 41. The front frame 40 is fixed to the backlight 38 with a screw.

As illustrated in FIGS. 2 and 3, there is a gap 43 between the backlight 38 and part of an inner wall surface 40a of the front frame 40. A first end of the FPC 26 is electrically coupled to the display panel 20, and a second end of the FPC 26 passes through the gap 43 to be drawn to the outside of a space surrounded by the front frame 40. A fixing member 42 for fixing at least part of the FPC 26 in the gap 43 onto the inner wall surface 40a of the front frame 40 is arranged on the inner wall surface 40a of the front frame 40. The fixing member 42 is, for example, a piece of double-sided tape bonded to the inner wall surface 40a of the front frame 40. After the FPC 26 is fixed onto the inner wall surface 40a with the fixing member 42, the backlight 38 is fitted into the front frame 40.

Figure 4:
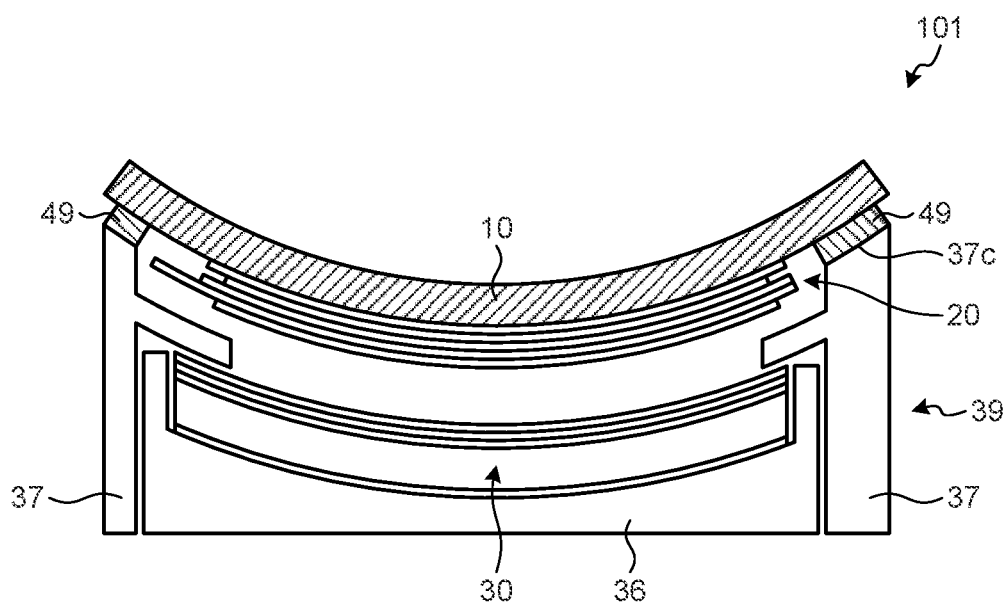
FIG. 4 is a cross-sectional view of a display device according to a comparative example.
Figure 5:
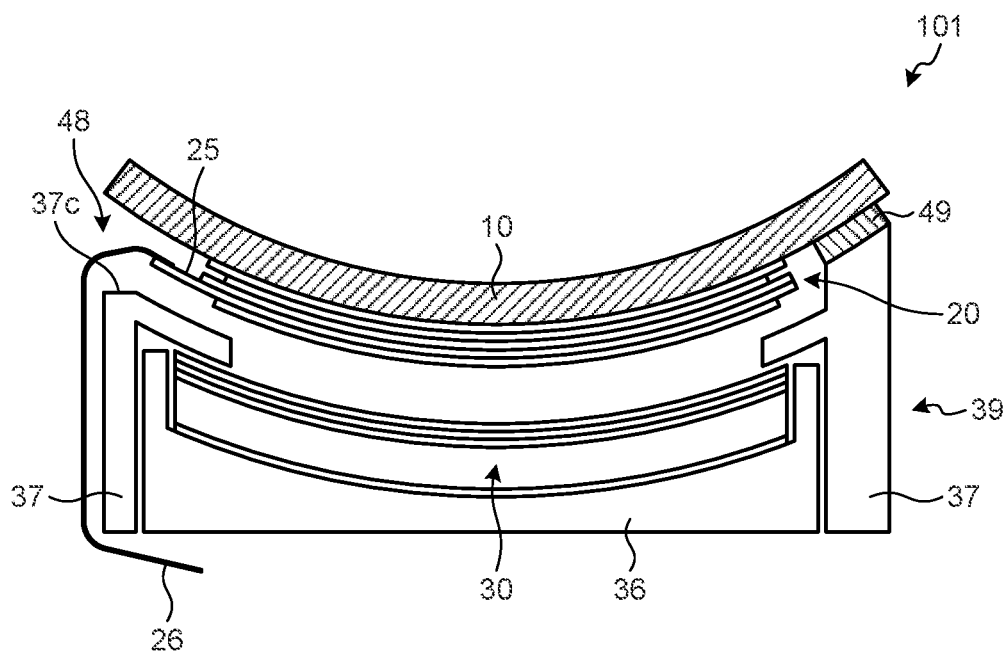
FIG. 5 is a cross-sectional view of the display device according to the comparative example.

The following describes the effects of the display device 100 that have been described above being compared with a display device 101 according to a comparative example illustrated in FIGS. 4 and 5. FIG. 4 is a cross-sectional view of a portion of the display device 101 to which the FPC 26 is not provided. FIG. 5 is a cross-sectional view of a portion of the display device 101 to which the FPC 26 is provided. Components of the display device 101 common to those of the display device 100 are denoted by the same reference numerals.

The display device 101 is different from the display device 100 in that the covering member 10 is fixed to a backlight 39 via a bonding layer 49. The backlight 39 is bonded to the covering member 10 at a position surrounding the display panel 20. The bonding layer 49 has an opening through which the FPC 26 is drawn to the outside, which forms a gap 48 between the upper end surface 37c and the curved surface part of the covering member 10. Thus, a foreign substance may enter a space between the covering member 10 and the backlight 39 through the gap 48.

On the other hand, in the display device 100 according to the embodiment, sides of the display panel 20 and the backlight 38 are covered by the front frame 40 across the entire circumference. The bonding layer 45 that bonds the front frame 40 to the covering member 10 is formed in a closed ring shape, and there is no gap between the upper end surface 40b of the front frame 40 and the curved surface part 10a of the covering member 10. Accordingly, a foreign substance hardly enters a space between the covering member 10 and the backlight 38.

If any defect is detected in the display device 101, disassembling work (rework processing) is required. In this case, disassembling work is difficult to perform if the covering member 10 is bonded to the backlight 39 via the bonding layer 49. Bonding work is difficult for bonding the backlight 39 to the curved covering member 10, so that defective bonding is frequently caused. Accordingly, a burden of the disassembling work is increased.

On the other hand, in the display device 100 according to the embodiment, the backlight 38 is fitted into the front frame 40 and fastened with a screw. The backlight 38 is not bonded to the covering member 10 via the bonding layer, so that the disassembling work is easily performed.

The display device 101 does not include the fixing member for fixing the FPC 26, so that the FPC 26 may interfere with the backlight 39 in bonding the backlight 39 to the covering member 10. When the FPC 26 interferes with the backlight 39, unintended stress may be applied to the projecting part 25 and the projecting part 25 may be damaged. In electrically coupling the second end of the FPC 26 to another electronic component, the projecting part 25 may be pulled together with the FPC 26, and the projecting part 25 may be damaged.

On the other hand, in the display device 100 according to the embodiment, the FPC 26 is fixed onto the inner wall surface 40a of the front frame 40. Thus, the FPC 26 is hardly drawn to the covering member 10 side in fitting the backlight 38 into the front frame 40. Accordingly, there is little possibility that the projecting part 25 is lifted to the covering member 10 side together with the FPC 26 and the projecting part 25 is damaged. There is also little possibility that the projecting part 25 is pulled together with the FPC 26 in electrically coupling the second end of the FPC 26 to another electronic component and the projecting part 25 is damaged.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. A display device comprising:
a covering member having a curved lower surface;
a display panel that is curved along the curved lower surface and bonded to the curved lower surface;
a front frame that is bonded to the curved lower surface and surrounds the entire outer circumference of the display panel;
a backlight that is fitted into the front frame and arranged to be opposed to the display panel, the back light including
a first frame having a first frame body and a bottom plate that has a curved upper surface,
a second frame having a second frame body that surrounds a side of the first frame body, and
a light guide body that is curved along the curved upper surface and disposed on the curved upper surface; and
a gap between the backlight and part of an inner wall surface of the front frame; and
a flexible printed circuit board, a first end of the flexible printed circuit board being electrically coupled to the display panel, and a second end of the flexible printed circuit board passing through the gap to be drawn to the outside of a space surrounded by the front frame,
wherein the front frame includes a claw part for positioning the backlight at a position separated from the display panel,
wherein the claw part projects from the inner wall surface, and
wherein the claw part has:
an inner most surface disposed outside an outermost of the display panel;
an upper surface bonded to the curbed lower surface of the covering member; and
a lower surface facing an upper surface of the second frame body.

2. The display device according to claim 1, wherein a fixing member is arranged on the inner wall surface of the front frame, the fixing member fixing at least part of the flexible printed circuit board in the gap onto the inner wall surface of the front frame.

3. The display device according to claim 2, wherein the fixing member is a piece of double-sided tape bonded to the inner wall surface of the front frame.

4. The display device according to claim 1, wherein an upper end surface of the front frame bonded to the curved lower surface has a curved shape corresponding to a curved shape of the curved lower surface.

5. The display device according to claim 1, wherein
the display panel includes a first substrate and a second substrate opposed to the first substrate, and
each of the first substrate and the second substrate is a glass substrate having a thickness from 50 µm to 200 µm.

6. The display device according to claim 1, wherein
the second frame has an edge cover that projects from an inner surface of the second frame body and that is inclined toward a direction along the curved upper surface, and
the edge cover covers an upper edge of the light guide body.

7. The display device according to claim 1, wherein
the gap is provided between the second frame and the part of the inner wall surface of the front frame, along the inner wall surface of the front frame.

* * * * *